(12) United States Patent
Boms et al.

(10) Patent No.: US 7,261,620 B2
(45) Date of Patent: Aug. 28, 2007

(54) METHOD AND DEVICE FOR REPROFILING RAILWAY WHEELS

(75) Inventors: Manfred Boms, Wegberg (DE); Georg Hauschild, Aachen (DE); Alfred Heimann, Aachen (DE); Ralf Hock, Herne (DE); Hans-Joachim Reiche, Erkrath (DE)

(73) Assignee: Hegenscheidt-MFD GmbH & Co. KG, Erkelenz (DE)

( * ) Notice: Subject to any disclaimer, the term of this patent is extended or adjusted under 35 U.S.C. 154(b) by 167 days.

(21) Appl. No.: 10/296,556

(22) PCT Filed: May 25, 2001

(86) PCT No.: PCT/EP01/05978

§ 371 (c)(1),
(2), (4) Date: Jun. 6, 2003

(87) PCT Pub. No.: WO01/89748

PCT Pub. Date: Nov. 29, 2001

(65) Prior Publication Data

US 2004/0014405 A1    Jan. 22, 2004

(30) Foreign Application Priority Data

May 25, 2000   (DE) ............................... 100 25 724

(51) Int. Cl.
*B24B 29/00*    (2006.01)
*B24B 5/00*    (2006.01)
(52) U.S. Cl. ........................ 451/254; 82/105; 409/165

(58) Field of Classification Search ................ 451/347, 451/348, 424, 285, 429, 254; 82/104, 105, 82/8; 409/165, 166, 199
See application file for complete search history.

(56) References Cited

U.S. PATENT DOCUMENTS 2,754,630 A    7/1956   Jones (Continued)

FOREIGN PATENT DOCUMENTS

AU       4349199 A1       3/2000

(Continued)

*Primary Examiner*—Jacob K. Ackun, Jr.
(74) *Attorney, Agent, or Firm*—Proskauer Rose LLP

(57) ABSTRACT

The present invention relates to a method for reprofiling wheel disks (7) or brake disks of a railway wheel or wheelset (6), rotatably mounted in bearing housings (9), by machining using a machine tool (12), which is designed to be portable, a wheel disk (7) of the railway wheel or the wheelset (6) being pressed against backup rolls (16) on its circumference by a clamping element (14, 15), which engages on at least one bearing housing (9), at least one of the backup rolls setting the railway wheel or the wheelset (6) into rotation, while simultaneously a tool (20) machines one of the wheel (7) or brake disks. The invention also relates to a machine tool (12) for carrying out the method. This machine tool (12) has a portable support frame (11) having a clamping element (14, 15) for engaging on a closed inner and/or outer bearing housing (9) of the railway wheel or wheelset (6), and at least one backup roll (16), which may be pressed against the outer circumference of the wheel disk (7), on whose bearing housing(s) (9) the clamping element (14, 15) engages, at a mutual distance to one another opposite to the clamping element (14, 15), a drive for at least one of the backup rolls (16), and a tool (20) for machining wheel (7) or brake disks (23) of the railway wheel or wheelset (6).

1 Claim, 1 Drawing Sheet

U.S. PATENT DOCUMENTS

| | | | |
|---|---|---|---|
| 3,367,160 A | | 2/1968 | Sperber et al. |
| 3,598,017 A | * | 8/1971 | Saari .......................... 409/165 |
| 4,347,769 A | * | 9/1982 | Dombrowski et al. ........ 82/104 |
| 4,399,724 A | | 8/1983 | Dombrowski |
| 4,951,534 A | * | 8/1990 | Brinkmann et al. .......... 82/105 |
| 5,105,691 A | * | 4/1992 | Brinkmann et al. .......... 82/105 |
| 5,679,059 A | * | 10/1997 | Nishi et al. ................... 451/41 |
| 6,347,550 B1 | * | 2/2002 | Kroening et al. ............. 73/598 |

FOREIGN PATENT DOCUMENTS

| | | |
|---|---|---|
| DE | 488 261 | 12/1929 |
| DE | 1 285 839 | 12/1968 |
| DE | 41 28 519 A1 | 3/1992 |
| DE | 42 38 787 A1 | 5/1994 |
| EP | 0 338 217 A2 | 10/1989 |
| EP | 0 456 845 A1 | 11/1991 |
| GB | 268381 | 11/1927 |
| JP | 9234602 | 9/1997 |

* cited by examiner

METHOD AND DEVICE FOR REPROFILING RAILWAY WHEELS

BACKGROUND OF THE INVENTION

The present invention relates to a method and a machine for machining railway wheels. The machining extends not only to the reprofiling of wheels of individual wheel trucks, but also to the reprofiling of the wheels of wheelsets. It also extends to the reprofiling of brake disks, whether they are on individual wheel trucks or on the wheelsets of other trucks. The requirement for carrying out the machining according to the present invention is that the affected railway wheel and/or the wheelset is rotatably mounted in axle bearing housings. In this case, the individual wheel and/or the wheelset to be machined may be in the uninstalled state, but the individual wheel and the wheelset may also be machined in the installed state.

The wheels and brake disks of railway vehicles wear out due to material wear, plastic deformation, and braking and acceleration processes. For these reasons, they have to be reprofiled from time to time, and this is typically performed through machining. For uninstalled wheelsets, the reprofiling is performed on surface lathes, which have a high metal removing capacity. However, the outlay for dismounting and remounting the wheelset is disadvantageous in this case, and this is particularly true for the wheelsets of traction vehicles, where it is required that the entire vehicle be operationally inspected after uninstallation of a traction wheelset.

For this reason, the underfloor machine tools were developed, over which the railway vehicle, with the wheelsets installed, is pulled or travels under its own power. The underfloor machine tools are typically set up in a separate hall, below the level of the rails, in a pit. Since they are designed for the machining of heavy vehicles using high metal removing forces, they also have a correspondingly high weight. In addition, it is necessary that an underfloor machine tool be attached to a heavy foundation. The investments for facilities in which underfloor machine tools are operated are correspondingly large. In comparison to surface machine tools, the metal removing performance of underfloor machine tools is somewhat lower.

For railway and local service companies which carry out their business using only a few vehicles, the investment for a wheelset machine tool, whether it is a surface or an underfloor machine tool, is hardly cost effective. These types of companies have therefore made the transition to uninstalling the wheelsets to be machined and sending them to specialized workshops, where the reprofiling of the wheel disks and machining of the brake disks may be performed. However, even in the main railways, there are only a few workshops which are equipped with wheelset machine tools. The consequence of this is that uninstalled wheelsets or entire trains and/or cars must sometimes be transported over long distances. In particular during times of more difficult operation, in autumn or winter, for example, many wheelsets arise which have to be reprofiled in between times. In between times in this sense means that the wheelsets and/or wheels must be reworked between the actual inspection intervals determined by the company. The weather conditions of autumn, with rain and falling leaves, lead to a peak demand for wheelset machining in many rail traffic firms. Sometimes, the capacity of the installed wheelset machine tools is not sufficient to cover the peak demand. Replacement times, non-availability, and transportation and logistics costs are added to the actual machining cost for the wheelsets.

SUMMARY OF THE INVENTION

From this, the object of the present invention results, of providing a universal wheelset machine tool which may be used at different locations as necessary. In this way, the transport of railway wheels, wheelsets, locomotives, trains, or cars is to be reduced and, simultaneously, the machine is to operate with sufficient precision for reprofiling of wheel disks or machining of brake disks. The machine is to be provided with its own power supply devices, and it is also to be connectable to already existing power supply devices of specialized workshops. In particular, the machine is to be used for machining both individual, uninstalled railway wheels and/or wheelsets and railway wheels or wheelsets which remain installed in the railway vehicle.

This object is achieved by a method for reprofiling wheel disks or brake disks of a railway wheel or wheelset rotatably mounted in bearing housings, through machining using a machine tool which
- is designed to be portable,
- a wheel disk of the railway wheel or the wheelset being pressed against backup rolls on its circumference by a clamping element, which engages on at least one bearing housing,
- at least one of the backup rolls setting the railway wheel or the wheelset into rotation, while simultaneously
- a tool machines one of the wheel or brake disks of the railway wheel or wheelset.

An essential idea of the present invention is that the device used for the machining of the wheel or brake disks is portable, i.e., is mobile. The device is therefore no longer connected to a specific usage location, but may be brought to the respective railway vehicle to be maintained and moved into the machining position.

For the machining of brake disks, both brake disks which are integrated into the wheel disk of a railway wheel and those which are attached to the shaft of a wheelset come into consideration. Typically, the outline profile of a wheel disk, using which the railway wheel or wheelset rolls on the rail, is machined. This may be the outline profile of the same wheel disk of a wheelset which is simultaneously set into rotation. However, the outline profile of the wheel disk of a wheelset which lies opposite to the driven wheel disk may also be machined. Machining of this type on the opposite side of a wheelset may be advantageous if additional devices, e.g., generators, etc., are flange-mounted on the axle bearing housing. While, for outline machining, both the running surface and the wheel flange or the outline of the running surface and wheel flange are machined, the reprofiling of brake disks is typically restricted to surfacing these disks.

The machining may be performed by removing metal, whether through lathing, milling, turn milling, or grinding. However, machining may also be provided in which the surface machined or to be machined is compacted with the aid of a tool, as is known, for example, from press polishing.

In addition, it is provided that the railway wheel or the wheelset may be subjected to an ultrasound test before or after the remachining. In a similar way, the railway wheel or the wheelset is to be measured using measurement technology before or after the reprofiling. The typical measurement procedures are known to one of average skill in the art.

The present invention also relates to a machine tool for carrying out the method. This machine tool is distinguished by a portable support frame. It is equipped with a clamping element for engaging on a closed inner and/or outer bearing housing of a railway wheel or wheelset. In addition, at least two backup rolls are provided, which may be pressed against the outer circumference of the wheel disk, on whose bearing housing(s) the clamping element engages, at a mutual distance to one another opposite to the clamping element, at least one of the backup rolls being provided with a drive. Furthermore, there is a tool for machining the wheel or brake disks of the railway wheel or wheelset in the portable machine tool. A tool of this type is typically positioned on a support and carries out the machining at a location on the circumference of the wheel disk where the backup rolls do not engage.

According to an advantageous exemplary embodiment, the frame of the machine tool is mounted on rollers or wheels and may be moved over the floor. With the aid of the rollers or wheels, the wheelset machine tool may be brought to any location of a workshop which offers the best space conditions. With the aid of the hoists typically present in a workshop, the railway wheel or the wheelset is lifted onto the wheelset machine tool and possibly fixed while the machining occurs. This is particularly true for railway wheels or wheelsets in the uninstalled state, sometimes a workshop hall not even having to be provided, but rather a suitable place, covered or in the open, on the workshop grounds being able to suffice.

The conditions are different for installed railway wheels or wheelsets. In the installed state, the railway wheel or the wheelset is permanently or removably connected to the associated railway vehicle. In railway vehicles which travel on trucks, the wheelsets are permanently installed in the trucks. Even in the installed state, the reprofiling of the railway wheels or wheelsets may be carried out with the aid of the machine tool. For this purpose, the railway vehicle is placed on stands at lifting points provided particularly for this purpose. The height of lifting on the stands is between 1 and 2.5 m above the floor. In this state, the machine tool is pushed under the railway vehicle on stands and engaged with at least one of the railway wheels. The portable machine tool may be introduced from the side of the railway vehicle on stands. However, it is typical to mount the portable machine tool on rollers or wheels which are guided along the workshop track. In this case, the machine tool is pushed in the longitudinal direction under the railway vehicle on stands until it is engaged with a wheelset.

During the machining of a railway wheel or wheelset, a torque acts on the machine tool, which may be absorbed by attachment to the workshop floor. For this purpose, it is advantageous to introduce additional attachment means between the frame and the workshop floor. Forces due to accelerations, in this case, particularly rotational accelerations of vehicle motors located on the wheelset shaft, must also be absorbed by the machine attachment. In this context, for example, a tool break may lead to sudden braking of the wheelset and briefly produce forces which exceed the cutting forces of the metal-removing machining.

Normally, the weight of the machine tool on its mounting points on the workshop floor is sufficient for absorbing the cutting forces. However, the machine tool may also be clamped onto the workshop track.

On the other hand, the machine tool is designed in such a way that an offset of the machine by a few millimeters in relation to the wheelset during its machining is unimportant for the machining result. This is true for an offset in the peripheral direction of the wheelset and in the axial direction. The intrinsic stiffness of the machine tool is high enough to permit this type of offset.

In a further embodiment, the machine tool is attached to a vehicle. This vehicle may be a road vehicle or a railway vehicle. The machine tool is conveyed to the location of its use with the aid of such a vehicle. In this case, further devices may also be present on the vehicle, which supply the machine tool with the necessary power, whether it is electrical power or power of a pressure medium, such as hydraulics or pneumatics. In addition, it is advantageous if the vehicle, using which the machine tool is transported, simultaneously also has hoists, using which a railway wheel, a truck, or a wheelset may be lifted and/or lowered for machining on the machine tool. If the machine tool is not attached, a ramp may be provided, via which the machine tool may be moved off of the transport vehicle, in order to be placed at the location at which the machining is to be performed. Even in such a case, the power supply device for the machine tool may also be carried by the transport vehicle, however, it is also possible to connect the machine tool to already existing infrastructures for power supply of a workshop.

The clamping element, using which the bearing housing of the railway wheel is grasped, may be operable both mechanically, via a spindle, and electrically, pneumatically, or hydraulically. An electric motor or a motor which may have a pressure medium applied to it, whether it is hydraulic or pneumatic, may be provided for driving one or more of the backup rolls. Lathing, broaching, milling, turn milling, grinding, or deep rolling tools may be considered as machining tools. With the aid of these tools, both the outline of a wheel disk may be machined and the active surfaces of a brake disk may be surfaced. In particular, each broaching, milling, turn milling, or grinding tool is to have its own drive. Typically, the machining tools are positioned on supports and machine the wheel disks on their circumference outside the backup and/or drive rolls. For machining railway wheels in the installed state, having the clamping elements act vertically from top to bottom and positioning the backup and/or drive rolls laterally outside the perpendicular wheel center suggests itself. The machining tool may then engage in perpendicular alignment below the clamping element. The measurement and testing devices, in contrast, may be provided at any desired location of the circumference of the railway wheel to be tested, as permitted by the space conditions. According to a further advantageous embodiment, an ultrasound testing head is provided which applies ultrasound to the wheel disk of the railway wheel or a wheelset. A measurement head lies opposite to the testing head, which receives the ultrasound pulses passing through.

It is also advantageous to measure the railway wheel and/or the wheel disk to be machined before the machining and also after the machining. In this way, the success of machining is ensured. Mechanical caliper elements or optical triangulation calipers suggest themselves as measurement instruments.

Of course, high precision is sought with the reprofiling of railway wheels and their brake disks according to the present invention. This is particularly true for high-speed wheels. However, in vehicles which run at lower speeds, for example freight vehicles or secondary line vehicles, lower precisions may also be sufficient. In this case, the goal of avoiding unnecessary wheelset transport or vehicle transfers is of primary concern. The machine tool is also equipped with guide plates or transport devices for chips, without these requiring a separate description. In the following, the present invention is described in more detail with reference to two exemplary embodiments.

DETAILED DESCRIPTION OF THE INVENTION

Figure 1:
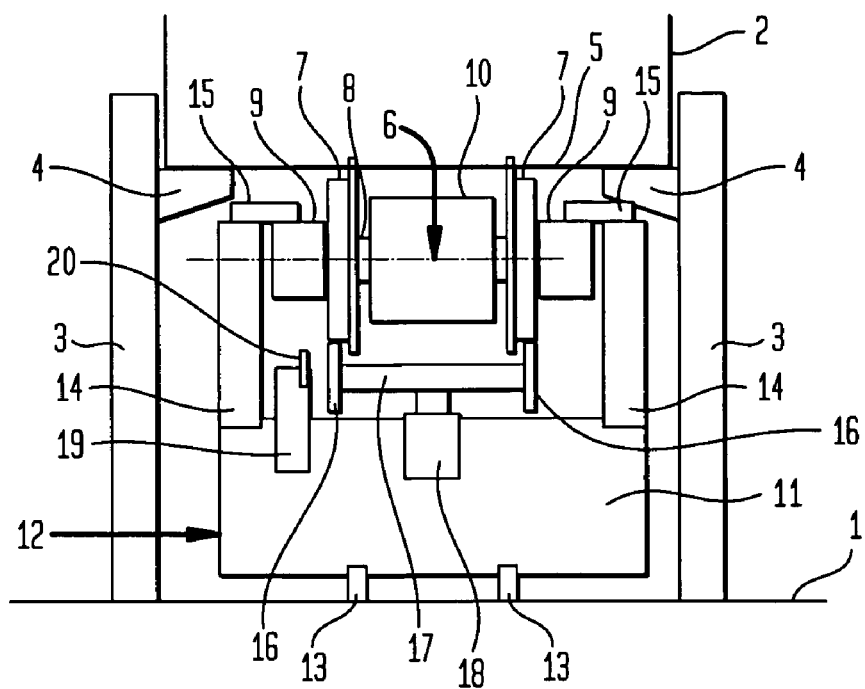
FIGS. 1 and 2 each show, in a greatly simplified, schematic illustration, side views of two different wheelset machine tools.

A railway vehicle 2 is on stands above workshop floor 1 in FIG. 1. The vehicle is put on stands with the aid of perpendicular columns 3 which stand laterally next to railway vehicle 2 on workshop floor 1. Railway vehicle 2 itself rests on brackets 4, whose height may be adjusted vertically along columns 3. Bottom edge 5 of the car body of railway vehicle 2 is at a height between 1 and 2.5 m above workshop floor 1.

FIG. 1 shows railway vehicle 2 viewed from its front end. A wheelset 6 is connected to railway vehicle 2, which is intended for the purpose of having both its wheel disks 7 run in a track. Wheel disks 7 are connected to wheelset shaft 8 so that they rotate together and are rotatably mounted outside both wheel disks 7 in axle bearing housings 9. In the present example, wheelset 6 of a traction vehicle 2 is shown, on whose wheelset shaft 8 a drive motor 10 is also positioned. Wheelset 6 is connected to railway vehicle 2 via both bearing housings 9; the details of the connection are left out in FIG. 1 for reasons of better visibility.

Below railway vehicle 2 on stands, the frame 11 of a machine tool 12 is brought into the operating position. Frame 11 is movable with the aid of rollers 13 or wheels along a workshop track (not shown), via which railway vehicle 2 was previously rolled into the workshop. The width of frame 11 of machine tool 12 is dimensioned in such a way that it passes between columns 3 of the stands.

Clamping elements 14 project upward on both sides of frame 11. The outer, upper ends of clamping elements 14 are provided with clamping claws 15, using which they engage from above and outside on both closed bearing housings 9 of wheelset 6. Clamping elements 14 press wheelset 6 downward until wheel disks 7 come into contact with backup rolls 16. In the present example, backup rolls 16 are positioned on an identical shaft 17, which rests on an abutment 18, which is provided in frame 11 of machine tool 12. Backup rolls 16 are rotatably mounted on shaft 17 and at least one of both backup rolls 16 has its own drive (not shown), via which wheelset 6 is set into rotation upon contact of wheel disk 7 and backup rolls 16.

In the present, simplified example, backup rolls 16 are illustrated as if they are located perpendicularly below wheel disks 7. However, they are actually positioned below the perpendicular wheel center of wheel disks 7, and laterally offset by an angle (not shown). In total, four backup rolls 16 of this type are provided in FIG. 1. Abutment 18 is designed in such a way that backup rolls 16 are elastically pressed laterally from below against wheel disks 7. This elasticity is, for example, achieved by implementing abutment 18 as a hydraulic or pneumatic cylinder which is assigned a pressure generator and a pressure storage for the respective pressure means. Through the elastic support, backup rolls 16 may adjust themselves to possible eccentricities of wheel disks 7, without slip occurring during driving.

At least one support 19, which is equipped with a tool 20, in the present case a cutting chisel, for example, is provided on frame 11. Instead of a single support 19, a further support (not shown), having a corresponding tool 20, may also be positioned on frame 11. Tool 20 is provided for the purpose of machining the outline contour of wheel disks 7. For this purpose, it is engaged on the circumference of a wheel disk 7. Wheelset 7 is set into rotation via one of backup rolls 16, while tool 20 performs the reprofiling of wheel disk 7 on the circumference of wheel disk 7 by removing metal.

Figure 2:
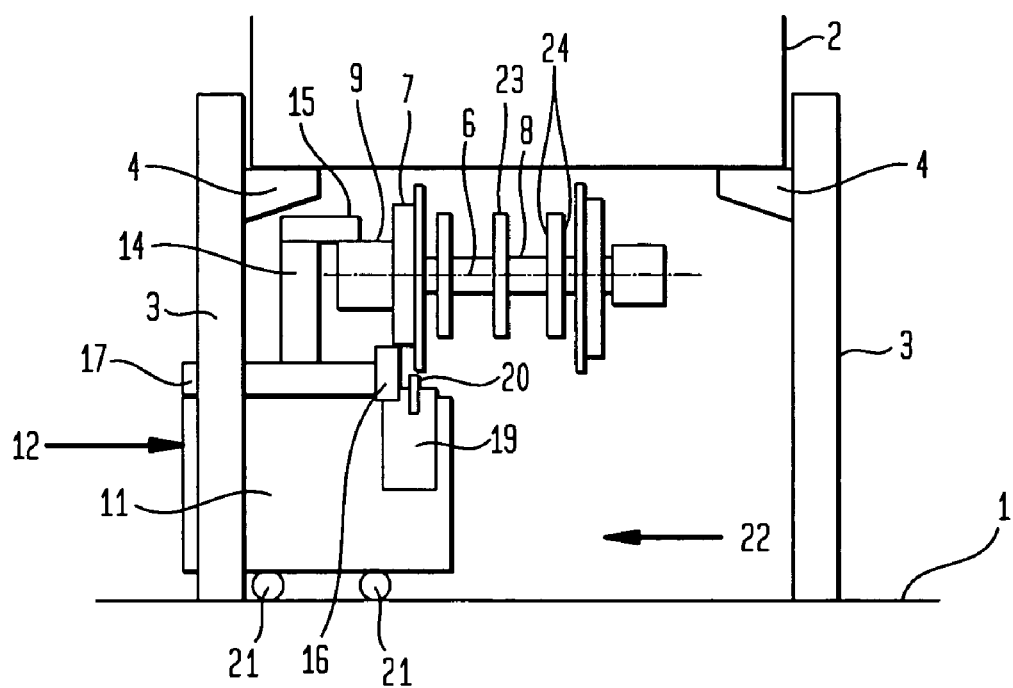

A further embodiment of a wheelset machine tool 12 is illustrated in the exemplary embodiment of FIG. 2. Wheelset machine tool 12 again has a frame 11, which is movable on rollers 21 over the floor on workshop floor 1. Rollers 21 are not restricted to a track, so that machine tool 12 of the exemplary embodiment of FIG. 2 may also be pushed laterally, next to columns 3, under railway vehicle 2 on stands.

Wheelset 6 is also connected to railway vehicle 2. A clamping element 14, which engages from above, using a clamping claw 15, on bearing housing 9 of wheelset 6, projects upward from frame 11. A backup roll 16 rotatably mounted in a shaft 17 of frame 11 engages on the outer circumference of wheel disk 7, which is pressed against backup roll 16 via bearing housing 9. As in the exemplary embodiment of FIG. 1, it is true for backup rolls 16 in FIG. 2 that two backup rolls are provided at a lateral distance next to one another below the perpendicular center of wheel disk 7.

A cutting chisel 20 is attached onto a support 19 so that it is adjustable in the radial direction on wheel disk 7. With the aid of cutting chisel 20, the outline of wheel disk 7 of wheelset 6 is also machined in this case. In the case of the exemplary embodiment of FIG. 2, only one single wheel disk 7 is machined at a time. After wheel disk 7 is completely machined, machine tool 12 is pulled out from under railway vehicle 2 laterally and, for example, on the right half of the illustration shown in FIG. 2, pushed back laterally under railway vehicle 2 in the direction of arrow 22, in order to machine second wheel disk 7. In addition to wheel disks 7, brake disks 23 are also attached to wheelset shaft 8 so that they rotate together. Machine tool 12 is also suitable for the purpose of surfacing lateral surfaces 24 of brake disks 23.

In addition to the exemplary embodiment shown in FIGS. 1 and 2, a machine tool 12 according to the present invention may also be set up at any desired location outside or in a workshop hall. The machine tool set up in this way is then supplied an individual railway wheel or a wheelset, so that the machining may be performed. After completion of the work, the machine tool is transported to another location, which may be at a great distance to the location illustrated in the examples of FIGS. 1 and 2. In the two simplified illustrations of FIGS. 1 and 2, all of the operating means known to one of average skill in the art are left out for clarity, for example wheelset attachment, drive assemblies, power supply, power connections, and measurement and testing devices.

LIST OF REFERENCE NUMBERS

1 workshop floor
2 railway vehicle
3 columns
4 brackets
5 bottom edge
6 wheelset
7 wheel disk
8 wheelset shaft
9 bearing housing
10 drive motor
11 frame
12 machine tool 13 roller
14 clamping element
15 clamping claw
16 backup roll
17 shaft
18 abutment
19 support
20 cutting chisel
21 roller
22 transport direction
23 brake disk
24 lateral surface

The invention claimed is:

1. A machine tool for reprofiling wheel disks of a railway wheel or wheelset, rotatably mounted in bearing housings, comprising:

a portable support frame, which is mounted on rollers which are movable on a track, having a clamping element for engaging on a closed inner and/or outer bearing housing of a railway wheel or wheelset, and at least one backup roll, for pressing against the outer circumference of a wheel disk, on whose bearing housing(s) a clamping element engages, at a mutual distance to one another opposite to the clamping element a drive for at least one of the backup rolls, and a tool for machining wheel or brake disks of the railway wheel or wheelset.

* * * * *